Dec. 20, 1960     J. I. FREDRIKSSON     2,964,823
PROCESS OF MAKING RECRYSTALLIZED SILICON CARBIDE ARTICLES
Filed Oct. 16, 1957

Fig. 1

SLIP HAVING AT LEAST 10% WATER AND AT LEAST 45% HARD REFRACTORY CARBIDE CRYSTAL PARTICLES, THE PARTICLES BEING, BY WEIGHT, FROM 40% TO 90% FROM 0.1 TO 8 MICRONS, FROM 10% TO 60% FROM 45 TO 150 MICRONS WITH AT LEAST 50% BELOW 300 MICRONS AND NOT OVER 5% OF COLLOIDAL SIZE, THE SOLE INSOLUBLE SOLID MINERAL CONSTITUENT OF THE SLIP BEING HARD REFACTORY CRYSTAL PARTICLES OF WHICH AT LEAST 50% ARE SILICON CARBIDE AT LEAST 95% PURE.

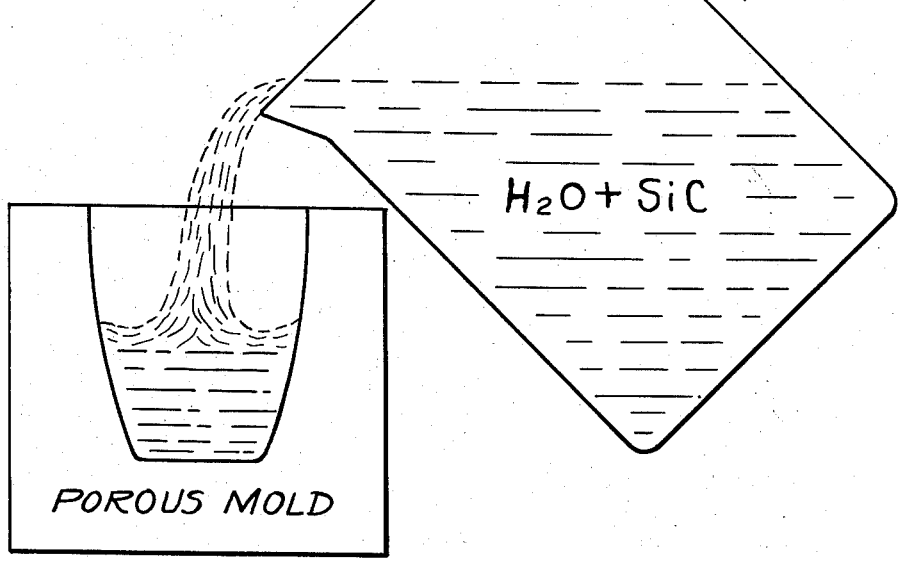

Fig. 2

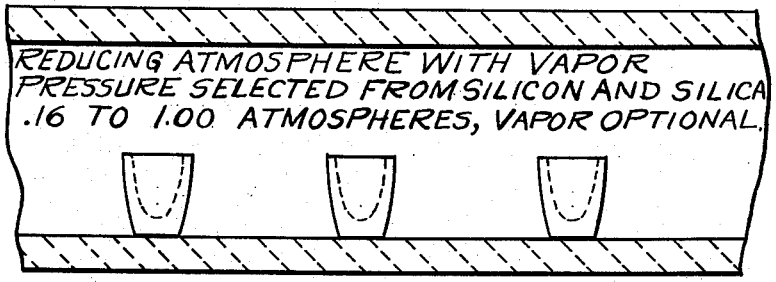

INVENTOR
JOHN I. FREDRIKSSON
BY
ATTORNEY

United States Patent Office 2,964,823
Patented Dec. 20, 1960

2,964,823

PROCESS OF MAKING RECRYSTALLIZED SILICON CARBIDE ARTICLES

John I. Fredriksson, Niagara Falls, Ontario, Canada, assignor to Norton Company, Worcester, Mass., a corporation of Massachusetts Filed Oct. 16, 1957, Ser. No. 690,435

Claims priority, application Canada Apr. 20, 1954

14 Claims. (Cl. 25—156)

The invention relates to the production of recrystallized silicon carbide articles. This application is a continuation in part of my copending application Serial No. 502,725, filed April 20, 1955, now abandoned.

One object of the invention is to provide a process for making articles of various shapes which consist of at least 50% silicon carbide made of integrally united crystal particles, it being understood that the silicon carbide may have the usual impurities associated with silicon carbide so that particles thereof may have as much as 5% impurities by weight but nevertheless cannot be melted and will not dissociate under about 2450° C., their resistance to oxidation being close to that of the purest silicon carbide known; such crystal particles will for a long time resist oxidation by atmospheric air under 30″ barometric pressure at 1400° C. and for a short time at even 1700° C. In accordance with my invention the remainder of the article consists of hard refractory carbide crystal particles also, which may be more silicon carbide.

Another object of the invention is to make crucibles, vessels, combustion boats, dishes, mortars and laboratory ware of all kinds, which are essentially silicon carbide or silicon carbide and other carbide, i.e. have no bond, by a readily practiced process. Another object is to provide a practical process for the manufacture of essentially silicon carbide etc. articles of irregular shapes such as turbine blades, rocket nozzles, venturis, etc.

Another object of the invention is to make strong, refractory filter tubes and filter plates for hydrofluoric acid, both liquid and gaseous. Another object of the invention is to make superior electrical resistors for heating purposes, as for use in high temperature furnaces. Another object is to make abrasive wheels for use according to U.S.P. 2,805,197.

Other objects will be in part obvious or in part pointed out hereinafter.

In the accompanying drawings illustrating pictorially with legends the process of the invention, Figure 1 illustrates the pouring of a slip into a porous mold to slip cast an article from the silicon carbide particles with or without hard refractory crystal particles that constitute the sole insoluble solid mineral constituent of the slip, Figure 2 illustrates firing the dried slip cast articles.

As conducive to a clearer understanding of the present invention, it is pointed out that silicon carbide cannot be melted at atmospheric pressure. It changes directly from a solid to a vapor, apparently with considerable decomposition. It is impossible to specify a temperature at which this process begins, but it becomes quite rapid in the range from 2500° C. to 2600° C. Therefore silicon carbide cannot be melted and cast.

Nevertheless as long ago as 1900, Francis A. J. Fitzgerald (see his U.S. Patent No. 650,235) discovered that silicon carbide could be recrystallized. In this phenomenon the crystals of silicon carbide when closely packed together (but not necessarily under mechanical pressure) grow together when heated to temperatures in the range of from about 2100° C. to about 2450° C. in a reducing atmosphere. This phenomenon is not dependent upon the possibility of a liquid phase at the gaseous pressure involved. I may here point out that the provision of gaseous pressure of much above atmospheric at temperatures of 2100° C. and above presents great practical difficulties.

However, as a practical matter the recrystallizing process, known commercially substantially only in connection with silicon carbide, has heretofore been limited to the production of simple shapes, such as round rods, and chiefly used for the manufacture of electrical resistor rods of silicon carbide. In the manufacture of such rods, silicon carbide crystals, mixed with a non-contaminating temporary binder such as sodium silicate solution, has been tamped into steel tubes; later the tamped rods were removed and fired. But this procedure is not satisfactory for making more difficult shapes such as those mentioned and others.

For the manufacture of shapes other than very simple ones such as solid cylinders, the slip casting technique has been one of the most practical in the ceramic and allied arts. However, I believe that no one else has prior to my invention produced, by the true slip casting technique, silicon carbide articles of practically 100% silicon carbide crystals, the articles being uncracked and of sufficient strength.

I have now discovered how to make integral silicon carbide articles by slip casting and firing. I use no permanent bond, so that the articles are as refractory as the silicon carbide itself. If I use green silicon carbide or light grey silicon carbide (better than 99% pure) my articles will stand temperatures up to 2400° C. in reducing atmospheres.

*Example I*

I made up a slip of 37.5% water and 62.5% silicon carbide (by weight, of course). I then added .5% of a wetting out agent, which itself was mostly water but had in solution about 25% of sodium dioctylsulphosuccinate. The silicon carbide was 30% from 45 microns to 150 microns in size, 100 mesh onto 325 mesh, and 70% very fine, meaning 8 microns and finer, and the lower limit I do not know except that there was no substantial percentage of particles of colloidal size. It was the green variety, better than 99% pure SiC. I mixed the foregoing thoroughly, then poured the resulting slip into a plaster of Paris mold, added more slip from time to time until the desired thickness was attained, then decanted the supernatant slip, dried for ten minutes in the mold, took the mold apart, dried the article further at about 100° C. for one day, and then fired the article for ten minutes in a reducing atmosphere at 2250° C. The furnace for firing was an electric resistor tube furnace as completely described in R. R. Ridgway's U.S. Patent No. 2,125,588, but other furnaces could be used. Also any other wetting out agent, of which there are scores, could be used. Examples are the alkali sulphonated alcohols, the alkali alkyl sulphates, and the alkali sulphonated aromatics. As in the other examples the silicon carbide was in the form of crystal particles of hexagonal habit, but the cubic habit variety can be used but if used the crystal habit will change to the hexagonal habit on firing, and furthermore I find that in order that the material shall cast properly from a slip the insoluble solid matter of the slip should be at least 50% by weight silicon carbide particles of the hexagonal habit.

*Example II*

The procedure, the ingredients and the proportions were exactly the same as in Example I excepting that the silicon carbide was 40% from 45 microns to 150 microns size, 100 mesh onto 325 mesh and 60% very fine, meaning 8 microns and finer as above defined in Example I.

The articles made first according to Examples I and II were crucibles for laboratory use. However, any other shape of article can be similarly made, merely the mold is varied. For making nozzles and venturis, I used four piece molds and kept on pouring slip until the walls were solid. The same technique can be used for making turbine blades, namely to use a multipart mold and to keep on pouring until the piece is solid.

In all cases the pourous mold, usually of plaster of Paris, removes water and all but less than 1% of material other than silicon carbide crystals. Porous molds of material other than plaster of Paris could be used, but I don't know of any better material.

*Example III*

The procedure, the ingredients and the proportions were exactly the same as in Example II (in which there was 37.5% water and 62.5% silicon carbide) excepting that in Example III I provided 20% water and 80% silicon carbide and I provided, in place of the formerly mentioned wetting out agent, 0.83% on the water content of diluted (50% water solution) sodium silicate as a deflocculant. This is an electrolyte and functions as such, keeping the particles in suspension. It acts as a dispersing agent. During the firing any residue of sodium silicate is dissociated, the sodium passes off as vapor, the oxygen unites with the reducing atmosphere, and the silicon forms more silicon carbide uniting with the carbonaceous vapor present. The tube of the furnace of Patent No. 2,125,588 is a graphite tube.

All articles were smooth (the articles of Example III were crucibles too) and each had a porosity of about 30% but each would hold water. Crucibles made as described can be used in which to melt various refractory metals and compounds. They do not leak, spall, crack, craze nor melt nor vaporize at temperatures below about 2450° C. They can be used in air up to 1400° C. or for a short time at up to 1700° C.

The sole insoluble solid mineral constituent of my slip is hard refractory carbide crystal particles. In the preferred embodiment of my invention all of these particles are silicon carbide crystal particles. Such articles as crucibles for melting materials such as synthetic mica which must be protected from contamination are best made out of silicon carbide. But for other purposes one or more other refractory hard carbides can be mixed with silicon carbide to make the slip. The other hard refractory carbides are TiC, VC, CrC, ZrC, HfC, NbC, MoC, TaC, WC and $B_4C$. All of these carbides are refractory above 2000° C. and outside of radioactive materials I believe this is a complete list of the hard refractory carbides. Two or more of them can be used in combination with the silicon carbide, but in all cases there should be at least 50% silicon carbide crystals present in the total solid insoluble mineral constituent.

It is important to use particles which are of different sizes. It is important to have a minimum of particles above a certain size (but a small number could be macroscopic and would appear as inclusions in the article). It is also important to have only a minimum of particles of colloidal size (0.1 to .001 micron). It is important that there be at least a minimum percentage of each of two different size ranges. It is important that there should be at least a certain percentage of crystals of relatively large size.

A slip of colloidal size particles will produce a piece which will shrink excessively on firing and will therefore be cracked. Colloids cannot be well filtered and one step in the preparations of fines is filtering. Furthermore any colloids in the slip go right into the plaster of Paris, plugging it up and gradually rendering the mold useless. The molds are used over and over to make successive articles and they are expensive. The shrinkage is also excessive unless there is at least 10 percent of particles of 45–150 microns size.

I have found that in order to make good articles and to achieve the objects and advantages of my invention, the percentage by weight of the particles of colloidal size should not exceed five percent and I don't need to have any at all. There should be at least 40% by weight of particles from 0.1 micron to 8 microns size and not more than 90% thereof, and there should be at least 10% by weight of particles from 45 microns to 150 microns size and not more than 60% thereof, to make good articles and to achieve the objects and advantages of my invention. It is difficult to give an upper limit to the size of the particles but there should probably be in a good article, no particles larger than one eighth of an inch. However I can say that at least 50% by weight of the particles should be below 300 microns size.

The porosity of the articles made in accordance with the present process can be controlled by varying the parameters of the recrystallizing technique and also by varying the particle sizes. More complete recrystallizing is achieved either by raising the temperature for the recrystallizing step of the process or by increasing the time at a given temperature, or by firing in an atmosphere such as silica vapour, or by all three. Strangely, a more completely recrystallized article has pores which are more anastomosing than one which is less completely recrystallized. On the other hand the finer (smaller) the sizes of the particles, or the greater the proportion of finer particles, the less will the pores interconnect. For liquid tight articles from 30% to 55% of the particles between 45 microns and 150 microns should be used. A slip having the minimum of fines in accordance with the above will produce porous pieces but for some uses such as filter tubes and filter plates these are very useful.

In the examples the particles of the different sizes were thoroughly mixed before adding the water in a rotating container having rubber balls. Any other means of thorough mixing could be used, and mixing can be done after the water and dispersing agent are added. Drying can be done in the mold if desirable as in the case of very complicated pieces, but it is frequently simpler to do most of the drying outside of the mold. The articles could even be fired in the molds but that would destroy the molds.

Proceeding according to Example III, I made some crucibles which thereafter were used for melting synthetic mica with very practical results, as the mica after resolidification was uncontaminated and none of it penetrated into or leaked through the crucibles.

*Example IV*

The procedure, the ingredients and the proportions were exactly the same as in Example III excepting that I fired the crucibles at 2400° C. for one half hour. These crucibles had anastomosing (interconnecting) pores and would leak water. They would also leak most molten metals. Tubes or plates so made are useful for filtering hydrofluoric acid, liquid or gaseous, and other highly corrosive liquids and gases which attack porcelains but will not attack silicon carbide.

The articles made according to Example I will hold (not leak) water and most molten metals. Articles made in accordance with Example II will leak water in about half an hour but will hold most molten metals. Articles according to Example III get damp on the outside when filled with water but do not pass it readily and will hold most molten metals except silicon.

In the recrystallizing step of the process, the fine, medium and large crystals start to grow together as soon as the critical temperature is reached. The higher the temperature, the faster the growth and the longer the time at temperatures of recrystallization, the greater the growth. At first the pores are small, like the crystals, and are not highly anastomosing, that is they do not freely interconnect. But as the crystals grow, the pores become more and more interconnected and the articles become more and more permeable. However it is not represented that the total porosity (volume of pore space) is much if any greater in Example IV than it is in Example I. In fact my estimate is that the total porosity was about the same for all of Examples I, II, III, IV, and V.

*Example V*

I made up a slip of 15.2% water and 84.8% silicon carbide, by weight. The silicon carbide was 50% between 45 microns and 150 microns, 100 mesh onto 325 mesh and 50% very fine, meaning eight microns and finer, as defined in Example I. It was the green variety, better than 99% pure hexagonal SiC. To this I added .1% of the wetting out agent of Example I, and .2% of sodium silicate of Example III as a deflocculant. The wetting agent is not necessary in this case, however, it is used to speed up the wetting. These percentages are percentages on the water and silicon carbide previously mentioned.

The slip ingredients were thoroughly mixed and then poured into a plaster of Paris mold to produce a rocket nozzle of venturi shape. This was a hollow relatively thin walled rocket nozzle shape weighing, when finished, about four and a half pounds. The mold was all of plaster of Paris made in four parts to leave, when joined, a cavity of the hollow paraboloidal or hyperboloidal shape of the venturi desired, with a sprue hole through which to pour the slip. The mold was placed so that the axis of the venturi was horizontal with the sprue hole axis vertical.

After pouring the slip to fill the cavity and the sprue hole to the very top, it was only about half an hour until most of the water had been absorbed by the plaster of Paris leaving the silicon carbide filling the space in the mold. However, while the water was being absorbed more slip was added from time to time to keep the level up to the top of the sprue hole as naturally the level would lower as the water was absorbed. It is desirable in slip casting to maintain the highest available hydraulic pressure by keeping the sprue hole full to the top.

The signal to open up a mold of this kind is when no more slip can be added to the sprue hole, that is to say when settling has ceased. Thereupon I took the mold apart and gently handling the nozzle I set it in a chamber and dried it at 150° F. for 12 hours.

This Venturi nozzle was then recrystallized at a temperature of about 2450° C. in a graphite chamber above a graphite crucible containing silica sand, with a baffle between them. The article was therefore fired in an atmosphere of silica which was also to some extent a reducing atmosphere on account of the hot graphite. The atmosphere was probably at least in part an atmosphere of silicon monoxide, therefore it is best called a silicon oxide atmosphere. This technique is fully described in U.S. Patent No. 2,677,627 of my colleagues Montgomery and Szymaszek dated May 4, 1954, it being understood that my Venturi nozzle of silicon carbide was substituted for the graphite nozzles shown and described in the above patent.

The silicon carbide grain of which this nozzle was made was well recrystallized and formed an integral shape. By reason of the atmosphere of silicon oxide during the recrystallizing a silicon carbide structure was formed which consisted of crystals of SiC at least 10 times as large as those formed in recrystallizing as described in previous examples. Nevertheless the surface of the rocket nozzle was very smooth to the touch. Shapes with large crystals of this type are more resistant to flame and their surfaces are harder than those of smaller crystal size. The crystals in size were about the size of the 150 microns silicon carbide that was used. From this the order of size of the crystals in the other examples can readily be understood.

At the end of the firing which takes about three hours of which about one hour is at the firing temperature mentioned, the graphite crucible originally filled full of silica sand contained nothing but silicon by reason of which it appears that during the latter part of the firing at least the atmosphere was silicon instead of silicon oxide. The oxygen is, of course, gradually removed from the silica vapour by the hot graphite which accounts for the change. Therefore it clearly appears that the superior results of firing in an atmosphere of silicon oxide can also be obtained at least to a large degree by firing in an atmosphere of silicon.

It should be understood that the recrystallizing in an atmosphere of silicon oxide is a step which can be used in all variations of the invention. That is to say the ingredients and proportions of any of the previous examples can be used to make shapes which are fired to recrystallize in an atmosphere of silicon oxide.

EXAMPLES OF SLIPS MADE FROM SiC AND $B_4C$

*Example VI*

The procedure, the ingredients and the proportions were exactly the same as in Example I (in which there was 37.5% water and 62.5% silicon carbide) excepting that in this example the silicon carbide ingredient was replaced by a mixture of silicon carbide and boron carbide in the weight ratio of 90% silicon carbide and 10% boron carbide. This mixture was made up of 40% silicon carbide from 45 microns to 150 microns in size, 100 mesh onto 325 mesh, 50% silicon carbide 8 microns and finer, and 10% boron carbide 8 microns and finer.

The articles made according to this example were crucibles for laboratory use and turbine blades.

*Example VII*

The procedure, the ingredients and the proportions were exactly the same as in Example III (in which there was 20% water and 80% silicon carbide) excepting that in this example the silicon carbide ingredient was replaced by a mixture of silicon carbide and boron carbide in the weight ratio of 80% silicon carbide and 20% boron carbide. This mixture was made up of 40% silicon carbide from 45 microns to 150 microns in size, 100 mesh onto 325 mesh, 40% silicon carbide 8 microns and finer, and 20% boron carbide 8 microns and finer.

The articles made according to this example were also crucibles and turbine blades.

The crucibles made in Examples VI and VII above had as much as 25% pores. However, they did not leak water since most of the pores were non-anastomosing. These crucibles will also hold, without leaking, moist molten metals including silicon. Chromium metal, mixtures of chromium and silicon, and silicon metal were melted in these crucibles and held at temperatures up to 2200° C. without leaking through the crucibles.

There is really no "best mode" in accordance with my invention. How the process should be carried out varies, depending upon what kind of an article is wanted. For purposes of complying with the statute, however, I select Example V as the best mode.

I anticipate that the type of articles wanted in the greatest number will call for use of an atmosphere selected from silicon and silicon oxide. I prefer to form the atmosphere by using silica as described in Example V. The minimum temperature is 2100° C. and maximum is 2450° C. for recrystallizing. "Some handbooks, especially in the older editions, give the boiling point of silicon under atmospheric pressure as 2600° C. However the U.S. Department of the Interior, in Bulletin 383, states that the most accurate value obtained to date as 2355° C."

Just as there is water vapor continually being produced by the oceans which never boil, so also there is a considerable vapor of silicon and of silicon-oxide produced by these materials at 2100° C. This is measured in vapor pressure and the equations are given in the bulletin referred to.

It turns out that the vapor pressure of silicon at 2100° C. is 0.16 atmosphere and that of silica is 0.39 atmosphere. At a vapor pressure of 1.00 atmosphere of either, the gaseous atmosphere would consist entirely of silicon or of silica respectively. It will be remembered that in Example V the material is all silicon oxide at the start, and therefore the partial pressure of silica at the start was at least 0.39 atmosphere. At the end, the silica had all been reduced to silicon, and the partial pressure of silicon in the atmosphere was always at least 0.16 atmosphere. While there was any silica present, the pressure of silica was always at least 0.39 atmosphere. The relative vapor pressures of silicon and its oxide at 2100° C. shows why I prefer to use silica to produce the atmosphere which, however, inevitably produces some silicon during the process. As silicon is more expensive than silica there is no particular advantage in using it to start with. However, there are occasions when only a minor siliconization is desired in which case silicon will be selected.

As the top of the range of firing temperatures is 2450° C. which is higher than the boiling point of either of silicon or its oxide (originally silica), in my process there can be a vapor pressure of silicon or its oxide or of both of 1.00. The vapor pressure of the oxide which is undergoing a change of state is properly reported as the vapor pressure of silica. Thus in a preferred form of my invention the reducing atmosphere has a vapor pressure selected from silicon and silica of from .16 to 1.00, and in a still further preferred form of my invention the reducing atmosphere has a vapor pressure of silica of from .39 to 1.00.

I have explained that sometimes it is desirable to use a wetting agent, a deflocculating agent, a dispersing agent, or an electrolyte. Many of these are organic, but some are inorganic (as the alkali or alkaline earth salts of the halogens) and soluble in water. The slip should contain at least 10% water and it should contain at least 45% hard refractory carbide particles. The above agents and the electrolyte are generically referred to as surface active agents.

As my invention is a process I should not be required to be more specific than in the following claims since many materials might be added to the slip so long as the slip will cast in a porous mold, which is preferably plaster of Paris, and so long as the mold will remove enough of the water to coalesce the crystals to form an article which can be handled without breaking, because if the added material is organic it will disappear in the firing, if the added material has a vapor phase below 2100° C. it will also disappear in the firing and if the entire mixture will recrystallize the article can be made.

It will thus be seen that there has been provided by this invention a process for making recrystallized silicon carbide articles in accordance with which the various objects hereinabove set forth together with many thoroughly practical advantages are successfully achieved. As various possible embodiments might be made of the mechanical features of the above invention and as the art herein described might be varied in various parts, all without departing from the scope of the invention, it is to be understood that all matter hereinbefore set forth is to be interpreted as illustrative and not in a limiting sense.

I claim:

1. The process of making recrystallized silicon carbide articles comprising preparing a free flowing slip of water and silicon carbide hexagonal crystal particles, said particles being at least 95% pure SiC, the sole insoluble solid mineral constituent of said slip being silicon carbide crystal particles, said slip having at least 10% water and at least 45% silicon carbide crystal particles, the particles being, by weight, from 40% to 90% from 0.1 to 8 microns, from 10% to 60% from 45 to 150 microns with at least 50% below 300 microns and not over 5% of colloidal size, casting the slip in a porous mold and by means of said porous mold removing sufficient of the water to coalesce the particles to form an article which can be handled without breaking, drying the article and then firing it and recrystallizing it in a reducing atmosphere at between 2100° C. and 2450° C.

2. Process according to claim 1 in which there is a vapor pressure selected from silicon and silica of from .16 to 1.00 atmosphere.

3. Process according to claim 2 in which the slip contains a surface active agent.

4. Process according to claim 3 in which there is a vapor pressure of silica of from .39 to 1.00 atmosphere.

5. Process according to claim 1 in which the slip contains a surface active agent.

6. Process according to claim 5 in which there is a vapor pressure of silica of from .39 to 1.00 atmosphere.

7. Process according to claim 1 in which there is a vapor pressure of silica of from .39 to 1.00 atmosphere.

8. The process of making recrystallized hard refractory carbide articles comprising preparing a free flowing slip of water and hard refractory carbide crystal particles, said crystal particles being at least 50% hexagonal silicon carbide at least 95% pure SiC, the sole insoluble solid mineral constituent of said slip being hard refractory carbide crystal particles, said slip having at least 10% water and at least 45% hard refractory carbide crystal particles, the particles being, by weight, from 40% to 90% from 0.1 to 8 microns, from 10% to 60% from 45 to 150 microns with at least 50% below 300 microns and not over 5% of colloidal size, casting the slip in a porous mold and by means of said porous mold removing sufficient of the water to coalesce the particles to form an article which can be handled without breaking, drying the article and then firing it and recrystallizing it in a reducing atmosphere at between 2100° C. and 2450° C.

9. Process according to claim 8 in which there is a vapor pressure selected from silicon and silica of from .16 to 1.00 atmosphere.

10. Process according to claim 9 in which the slip contains a surface active agent.

11. Process according to claim 10 in which there is a vapor pressure of silica of from .39 to 1.00 atmosphere.

12. Process according to claim 8 in which the slip contains a surface active agent.

13. Process according to claim 12 in which there is a vapor pressure of silica of from .39 to 1.00 atmosphere.

14. Process according to claim 8 in which there is a vapor pressure of silica of from .39 to 1.00 atmosphere.

References Cited in the file of this patent

UNITED STATES PATENTS

| | | |
|---|---|---|
| 1,585,010 | Bellamy | May 18, 1926 |
| 2,040,236 | Benner | May 12, 1936 |
| 2,188,693 | Thompson | Jan. 30, 1940 |
| 2,527,390 | Blaha | Oct. 24, 1950 |
| 2,706,382 | Logan et al. | Apr. 19, 1955 |